Sept. 2, 1969     N. JONES     3,464,447

VALVE MANIFOLD

Filed July 18, 1967     3 Sheets-Sheet 1

INVENTOR
Norman Jones

BY Charles H. Brown
ATTORNEY

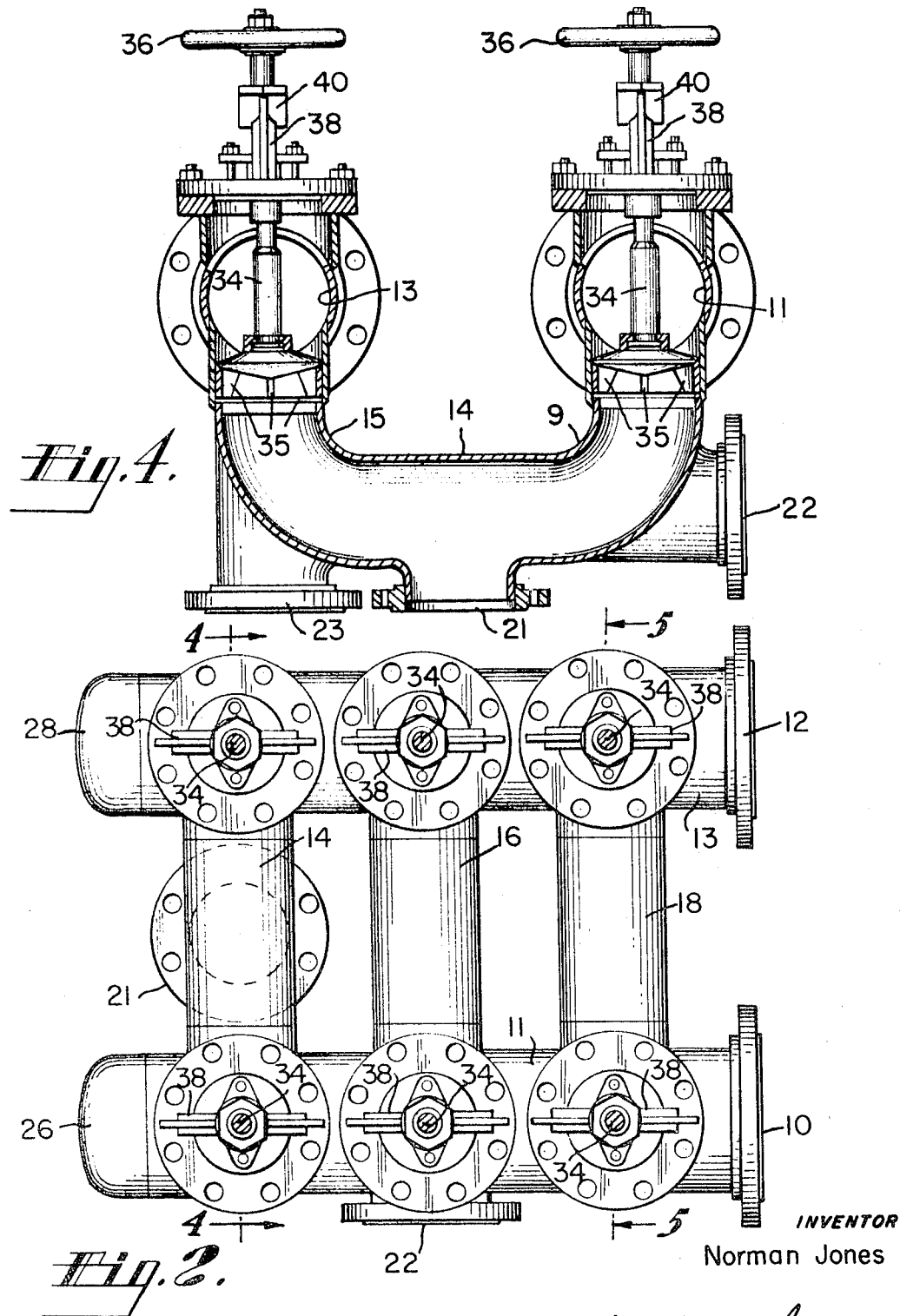

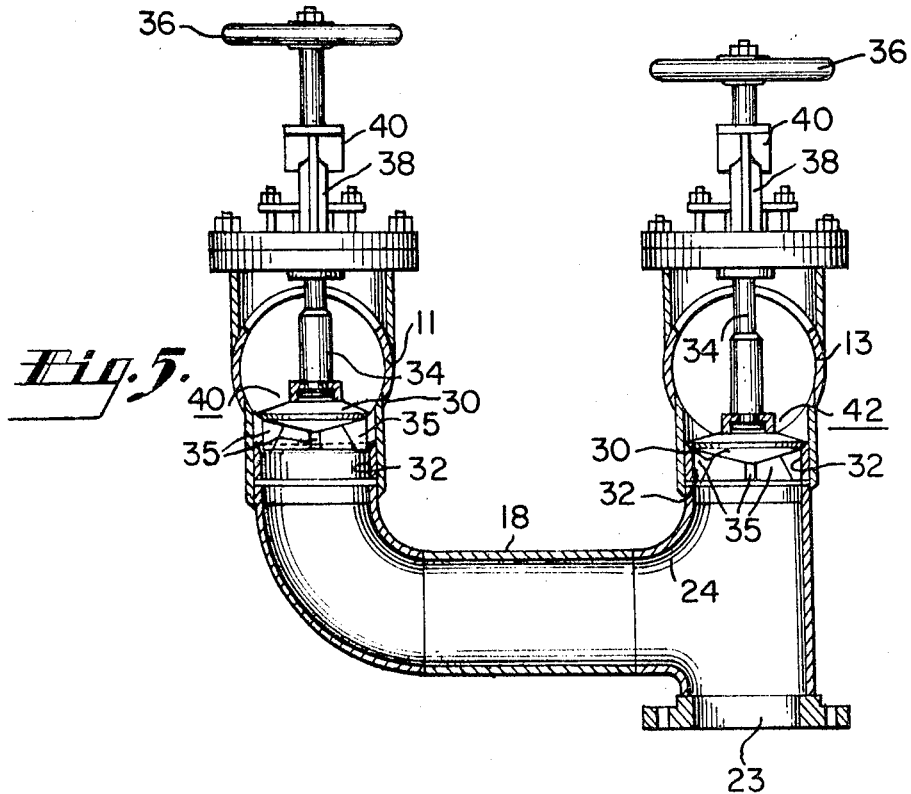

United States Patent Office 3,464,447
Patented Sept. 2, 1969

3,464,447
VALVE MANIFOLD
Norman Jones, Brooklyn, N.Y., assignor to Marine Engine Specialties Corp., New York, N.Y., a corporation of New York
Filed July 18, 1967, Ser. No. 654,121
Int. Cl. F17d 3/00
U.S. Cl. 137—608    3 Claims

ABSTRACT OF THE DISCLOSURE

A valve manifold or fluid distribution system for controlling the flow of fluids (oil, gasoline, etc.) into and from storage such as may be used in ships, wherein all passageways are circular in design and the closed end terminations of the main passageways are curved. The branch pipelines leading to the outlet ports communicate with the main passageways by the use of curved elbows. The main valve parts, except for the stems, are generally outside the main passageways and are seated in the openings for the branch lines.

---

This invention relates to fluid distribution systems and particularly to valve manifolds for controlling the flow of fluids into and from storage tanks and compartments such as may be used in ships (cargo, passenger and tankers), and in petroleum and chemical processing industries and the like. Such fluids may be oil, gasoline, slurries or gases.

Valve manifolds which are presently used for the transmission of liquids, gases and slurries incorporate a plurality of valves attached to an integral body usually made from cast iron, steel or bronze, and sometimes fabricated from steel plates welded or brazed together. The manifold usually consists of an inlet port or main supply pipeline to which is fed the fluid to be distributed and a plurality of smaller diameter outlet branch pipelines which feed outlet ports to be coupled to tanks, compartments or processing units. The number, type, size and disposition of the inlet and outlet ports and the valves vary with the specific requirements of the application. Thus, there are simplex, duplex and triplex valve manifolds. When the manifold is made by a casting process, partitions are used to separate different sections in the manifold as a result of which various problems arise, such as leakage, turbulence, etc. In plate fabricated manifolds, the welds are made in the high stress areas and are exposed to high corrosion rates due to the sediment build-up in the corners. The turbulence which occurs in such manifolds is caused by the non-uniform shape of the parts, and the construction and location of the valve components, as a result of which there is a pressure increase and a resulting increase in transfer time for the fluid to pass through the manifold.

The foregoing problems, as well as others which exist in known type valve manifolds, are overcome in the valve manifold of the present invention which provides a simple and effective construction for distributing fluids from a fluid pressure inlet port or main supply pipeline to one or more outlet ports through cylindrical sections or pipelines, and vice versa. The construction and design of the manifold of the invention is such that it eliminates all sharp corners in which sediment may tend to accumulate and cause corrosion, and reduces turbulence to an absolute minimum. The result is a substantially corrosion-free manifold with a fast fluid transfer time. Other advantages of the manifold present invention compared to known type manifolds are: compactness, lightness in weight, the absence of partitions which would tend to cause leakage, a circular design for all passageways which is relatively self-cleaning and minimizes turbulence, a novel and highly efficient disposition of inlet and exhaust valves, and simplicity in fabrication with a resulting reduction in the cost of manufacture.

In brief, the valve manifold of the present invention is based on a completely novel concept in design in that all passageways thereof including the main passageways and the branch lines and the fluid connecting joints are circular throughout, with curved or arcuate-shaped closed end terminations having interior concave surfaces for the main passageways. This novel construction promotes self-cleaning of the liquids and slurries which are being distributed. The valve engaging parts are generally recessed or removed from the fluid flow through the main passageways of the manifold, thereby reducing turbulence to a minimum. The construction of the valves is such that all valve seats are replaceable and can be repacked under pressure and require no cleaning. The branch pipelines communicate with the main passageways of the manifold by means of curved elbows thereby eliminating sharp angle corners in which sediment may build up and turbulence occur. The valve manifold of the invention may be simplex, duplex, or triplex.

A more detailed description of the invention follows in conjunction with a drawing in which:

FIGURE 2 is a top view of the manifold of the invention with the valve wheel handles removed;

FIGURE 4 is a sectional view of FIGURE 2 taken along line 4—4, partly in section extending through the center line as indicated by the arrows; and FIGURE 5 is a sectional view of FIGURE 2 taken along line 5—5, and which does not extend further than the center line indicated in FIGURE 2.

Figure 1:
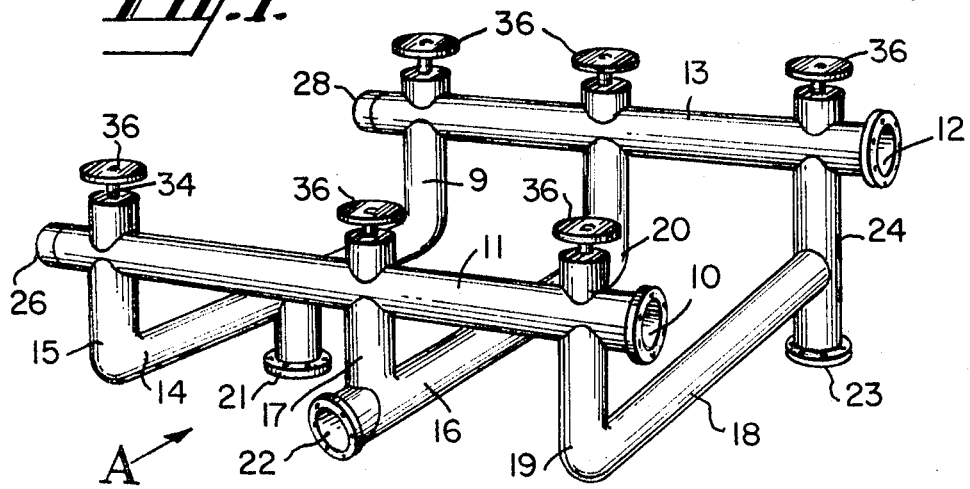
FIGURE 1 is a diagrammatic layout, given for orientation purposes only, of the manifold or fluid distribution system of the invention, with the component parts relatively widely spaced apart, as compared to the actual embodiment, in order to clearly show the manner in which the inlet and outlet ports and the valves are interconnected.

The valve manifold illustrated in the drawings is a duplex manifold and includes two inlet ports or main supply pipelines 10 only one of which may be used at any one time to supply or deliver fluid to the apparatus. The inlet ports respectively communicate with a pair of main passageways 11 and 13 composed of spaced cylindrical pipe sections. A plurality of spaced cylindrical pipe branch lines 14, 16 and 18 are in fluid communication with the main passageways through circular elbows or discharge risers 15, 17, 19, 20 and 24. Outlet ports 21, 22 and 23 are respectively connected to and in fluid flow communication with cylindrical branch lines 14, 16 and 18. These cylindrical branch line sections and the outlet ports may have any desired diameter not larger than the diameter of the main passageways and are adapted to be connected to and feed different tanks, compartments or processing units. All main passageways, branch lines, elbows and inlet and outlet ports are made of metal pipe, preferably steel and are connected together by welding or brazing, as shown, to provide fluid tight seals.

The main cylindrical passageways 11 and 13 are respectively closed at one end by curved or arcuate-shaped metallic terminations 26 and 28 with interior concave surfaces, suitable welded or brazed to the main cylindrical sections 11 and 13.

Suitable metallic flanges are bolted to the inlet ports 10 and 12 and to the outlet ports 21, 22 and 23 for connection with the main supply lines and distribution lines to the tanks, compartments or processing units, respectively. No claim to novelty is made herein to the manner of connecting flanges to the ports or associate supply and distribution lines.

Figure 3:
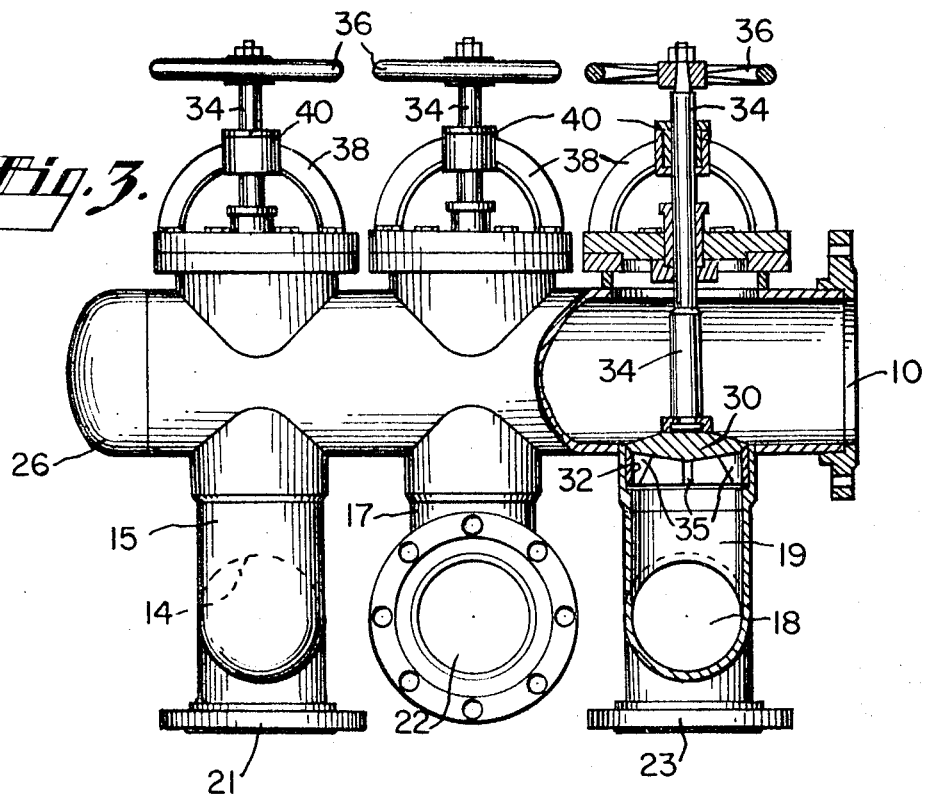
FIGURE 3 is a side elevation view, partly in section, of FIGURES 1 and 2, looking in the general direction of the arrow A of FIGURE 1.

Within each elbow or discharge riser at the junction with a main passageway there is provided a valve comprising a closure member or disc 30 tapered at its ends and adapted to engage the valve seat 32. The closure member 30 is connected to a stem 34 which terminates at one end in a rotatable wheel-like handle 36 for controlling the position of the valve. The rotatable wheel 36 and the stem are supported in a housing or casing 38 by a suitable bearing 40. Thus, if the wheel 36 is turned in one direction, the valve closure member 30 can be raised from its seat 32 to the open position as shown by the left hand valve 40 in FIGURE 5, while if the wheel 36 is turned in the opposite direction, the valve closure member is lowered to close the valve by causing the closure member 30 to engage the valve seat 32, as shown in FIGURES 3 and 4 and the right hand valve 42 of FIGURE 5. The valve seat 32 is provided with three guiding fingers 35 fixedly attached thereto at one end and which slide on the interior surface of the valve seat 32 in order to assure proper positioning of the valve closure member in relation to the valve seat.

An important aspect of the manifold design of the invention is that only the stem 34 of each valve is in the path of the liquid flow in the main passageway in which it is located, thus minimizing any turbulence which can occur due to liquid flowing through the valve manifold, as contrasted to known valves which are entirely within the main passageway. The time of liquid transfer through the valve manifold is hence enhanced in the manifold of the invention. Further, the valve construction and design is such as to enable the valve to be repacked and the valve seats replaced easily and simply.

Another important aspect of the manifold design of the invention is the absence of right angle and other angle corners due to the circular shape of the piping in the main passageways and in the branch line sections, and to the curved end terminations. Such construction prevents sediment build up and resulting corrosion because the circular and curved elements promote draining of the liquid and self-cleaning of the interior of the manifold.

The valve manifold herein described can be considered to be a module which can be added to other similar modules to increase the capability of the liquid distribution system merely by eliminating the curved end terminations of one module and attaching to this module at the locations of the removed terminations another module by the use of flanges and bolts or other suitable attachments. The features of the invention are utilizable in simplex, duplex and triplex valve manifold constructions, or any combination of these.

The valve manifold can be operated in known manner to fill any selected one or more tanks by suitable operation of the valves in one or both branch line passageways, or to withdraw fluid from one or more tanks and fill other tanks on one side or the other side of the manifold.

The manifold of the invention can be positioned in the vertical or horizontal position or at any desired intermediate angle thereto.

What is claimed is:

1. A valve manifold comprising a cylindrical pipe section constituting a main passageway having an inlet port at one end and a closed curved termination at its other end, the interior surface of said termination being entirely concave, branch lines in the form of cylindrical pipe sections joined to said main passageway by means of elbows having a circular cross-section, an outlet port associated with each branch line, said termination, branch lines, elbows and outlet port being joined to their respective joining parts, in such manner as to thereby eliminate areas in which sediment may build up and turbulence occur, a valve for each branch line located at the junction of the main passageway and the elbow which connects the branch line to said passageway, said valve having a valve seat which is an integral part of each branch line itself, and a tapered valve closure member engaging the valve seat and located generally outside the fluid flow path of said main passageway, said valve closure members each having a plurality of guiding fingers which slidably engage the walls of said valve seats for closing said valves, the stem of each valve passing from the closure member on one side of said passageway through said passageway to the opposite side of said passageway.

2. A valve manifold according to claim 1 including another passageway in the form of a cylindrical pipe section arranged parallel to said first passageway, each of said branch lines communicating with both main passageways by means of elbows having circular cross-sections throughout, there being a valve at each end of each branch line at the location where said branch line joins its associated main passageway.

3. A valve manifold according to claim 2, wherein each valve has a valve seat and a valve closure member generally outside the fluid flow path of said main passageway, the stem of said valve passing from said closure member on one side of said passageway through said passageway to the opposite side of said passageway in order to effect a more compact, relatively inexpensive and relatively lighter weight construction.

References Cited

UNITED STATES PATENTS

| 1,755,451 | 4/1930 | Morrison | 137—608 XR |
| 1,756,830 | 4/1930 | Marshall | 137—608 XR |
| 1,945,684 | 2/1934 | Glab | 137—608 |
| 2,163,591 | 6/1939 | Deverall | 137—608 XR |
| 2,275,608 | 3/1942 | Brisbane | 137—608 XR |
| 2,768,506 | 10/1956 | Cain | 137—608 XR |
| 3,039,489 | 6/1962 | Botkin | 137—608 |

SAMUEL SCOTT, Primary Examiner